July 22, 1952  J. W. BROWN  2,603,903
ARTIFICIAL FISHING LURE
Filed Sept. 10, 1948
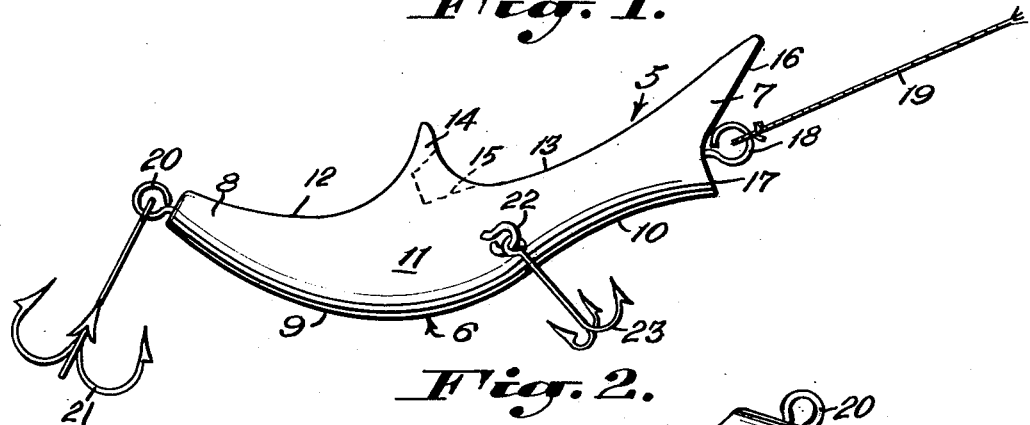
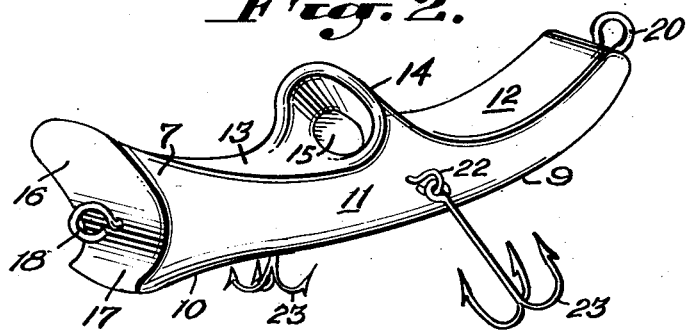
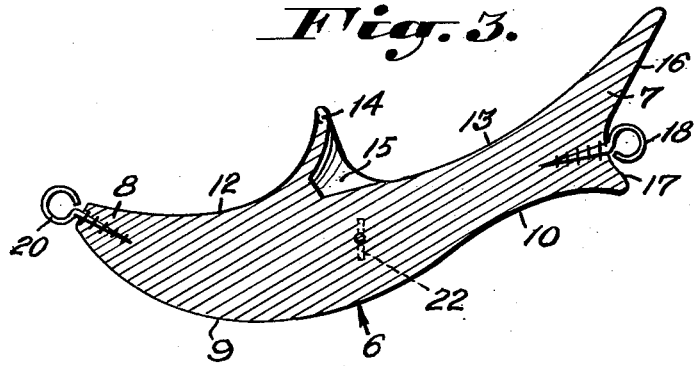
Inventor
John W. Brown
By John N. Randolph
Attorney Patented July 22, 1952

2,603,903

UNITED STATES PATENT OFFICE 2,603,903

ARTIFICIAL FISHING LURE

John W. Brown, Great Falls, Mont.

Application September 10, 1948, Serial No. 48,685

2 Claims. (Cl. 43—42.48)

This invention relates to a novel fishing lure having for its primary object to provide a structure which will cause the lure to follow an irregular course when drawn through the water as in trolling or retrieving for very realistically simulating the natural wiggling movement of small bait fish.

Another object of the invention is to provide a lure which is so constructed that when it is being drawn through the water, in addition to describing a wiggling movement very realistically simulating the swimming movement of a bait fish, will in addition produce a considerable wake for attracting game fish.

Various other objects and advantages of the invention will hereinafter become more fully apparent from the following description of the drawing, illustrating a preferred embodiment thereof, and wherein:

Figure 1 is a side elevational view of the lure;

Figure 2 is a perspective view looking from the side thereof opposite to Figure 1, and Figure 3 is a longitudinal sectional view of the lure taken substantially through the longitudinal center thereof.

Referring more specifically to the drawing, the novel artificial lure in its entirety is designated generally 5 and includes a lure body, designated generally 6, which may be formed of any suitable buoyant material and which is longitudinally bowed so that the leading and trailing ends thereof are disposed above the intermediate portion. The lure body 6 includes a leading or forward end 7 and a trailing end 8 and has an underside including a rear portion 9 which is convexly curved longitudinally and a forward portion 10 which is concavely curved longitudinally. The lure body 6 has corresponding sides 11 which are rounded at their upper and lower edges to merge with the bottom portions 9 and 10 and with the top of the lure body which includes a longitudinally curved concave or inwardly bowed upper rear portion 12 and an upper forward portion 13 which is likewise longitudinally bowed and concave.

Between the upper surfaces 12 and 13, the lure body 6 is provided with an integral upwardly extending enlargement 14 having tapered forward and rear sides which merge with the adjacent ends of the upper surfaces 12 and 13. The forward side of the enlargement 14 is recessed to form the forwardly and upwardly opening socket 15.

The forward end portion 7 of the body 6 is substantially thicker in a direction from the top to bottom thereof than the trailing end portion 8 and the upper surface 13 extends forwardly to beyond the bottom surface 10. The forward end of the body 6 comprises a face having a substantially flat upper surface 16 which extends upwardly and forwardly with respect to the body 6 and a lower concave face portion 17 which merges at its upper end with the lower rear end of the face portion 16 and which is curved downwardly and forwardly therefrom. Said upper face portion 16 is disposed in upwardly converging relationship with the forward end of the upper surface 13 and combines therewith to form an upper and forward extension of the body 6. A fish line engaging eye 18 is anchored in the body 6 and projects from the forward face adjacent to where the face portions 16 and 17 merge and is adapted to be connected to a fishing line as indicated at 19. It will be readily apparent that a swivel, not shown, could be interposed between the eye 18 and line 19.

The body 6 is also provided with a hook engaging eye 20 which projects from its trailing end 8 and to which the eye at the shank end of a multiple barbed hook 21 is connected. The body 6 is also provided with a hook engaging eye 22 which projects outwardly from each side 11 thereof intermediate of the ends of the body and to each of which eyes 22 a similar multiple barbed hook 23 is connected.

From the foregoing it will be readily apparent that when the buoyant lure 5 is drawn through the water by the fishing line 19 either in trolling or retrieving and in a direction from left to right of Figure 1, that the water impinging against the surface or face 16 will tend to cause the forward end 7 of the lure to rise. The socket 15 will also resist the forward movement of the lure 5 and the water escaping therefrom over the top of the body portion 14 and around the sides thereof will cause the lure to follow an irregular course and to execute a wiggling movement as it moves through the water to thereby very realistically simulate the swimming movement of small bait fish. Likewise, as the forward end 7 moves above the surface due to the impingement of the water on the surface or the face portion 16, the resistance of the forward motion afforded by the portion 16 will be reduced and the water impinging against the concave under surface 10 of the lure body will tend to cause the trailing end 8 to swing upwardly for submerging the forward end 7 and so that a greater portion of the surface 16 will again come in contact with the water, thereby producing a longitudinal rocking movement of the lure body simulating the leaping action of a swimming bait fish.

The aforementioned movements of the lure body and the resistance offered by the socket 15 will cause the lure 5 to produce a considerable wake which in combination with the irregular action of the lure will readily attract game fish.

Obviously, the lure 5 may be made in various sizes and has been illustrated in the drawing on an enlarged scale relative to its actual preferred size. Likewise, the surface of the lure body 6 may be suitably colored and marked to simulate different types of bait fish.

Various other modifications and changes are contemplated and may obviously be resorted to, without departing from the spirit or scope of the invention as hereinafter defined by the appended claims.

I claim as my invention:

1. An artificial trolling and retrieving surface lure comprising a buoyant lure body having an upwardly extending projection, said projection being provided with a forwardly opening socket, the open forward end of the socket being disposed approximately midway of the ends of the lure body, said lure body being longitudinally bowed and having an upper generally concave surface from the intermediate portion of which said projection extends, the underside of said lure body including a longitudinally and outwardly bowed rear portion and a longitudinally and inwardly bowed forward portion, the adjacent ends of said bowed portions merging to form an uninterrupted reverse curve extending from end-to-end of the underside of the lure body.

2. An artificial trolling and retrieving surface lure comprising a buoyant lure body having an upwardly extending projection provided with a forwardly opening socket, the open forward end of the socket being disposed approximately midway of the ends of the lure body, said lure body being longitudinally bowed and having an upper generally concave surface into the intermediate portion of which said projection extends, said lure body having an upwardly and forwardly projecting extension at its forward end defining an upwardly and forwardly extending leading surface of the lure having an upper portion disposed above the level of the socket, and the underside of said lure body including a longitudinally and outwardly bowed rear portion and a longitudinally and inwardly bowed forward portion, the adjacent ends of said bowed portions merging to form an uninterrupted reverse curve extending from end-to-end of the underside of the lure body.

JOHN W. BROWN.

REFERENCES CITED

The following references are of record in the file of this patent:

UNITED STATES PATENTS

| Number | Name | Date |
|---|---|---|
| D. 126,221 | Hutcheson | Apr. 1, 1941 |
| D. 147,102 | Adams | July 15, 1947 |
| 1,101,223 | Welles | June 23, 1914 |
| 1,906,791 | Grossmann | May 2, 1933 |
| 2,381,231 | Spear | Aug. 7, 1945 |
| 2,435,730 | Worden | Feb. 10, 1948 |
| 2,463,626 | Johnson | Mar. 8, 1949 |
| 2,467,244 | Van Hee | Apr. 12, 1949 |
| 2,493,487 | Grimm | Jan. 3, 1950 |
| 2,546,516 | Nardi | Mar. 27, 1951 |